3,474,325
CONTROL CIRCUITRY FOR SWITCHING-TYPE POWER SUPPLY
Johannes M. Schaefer, Wilton, Conn., assignor to Technipower Incorporated, South Norwalk, Conn., a corporation of Connecticut
Filed Apr. 21, 1967, Ser. No. 632,703
Int. Cl. G05f 1/40, 1/52, 1/60
U.S. Cl. 323—20                              29 Claims

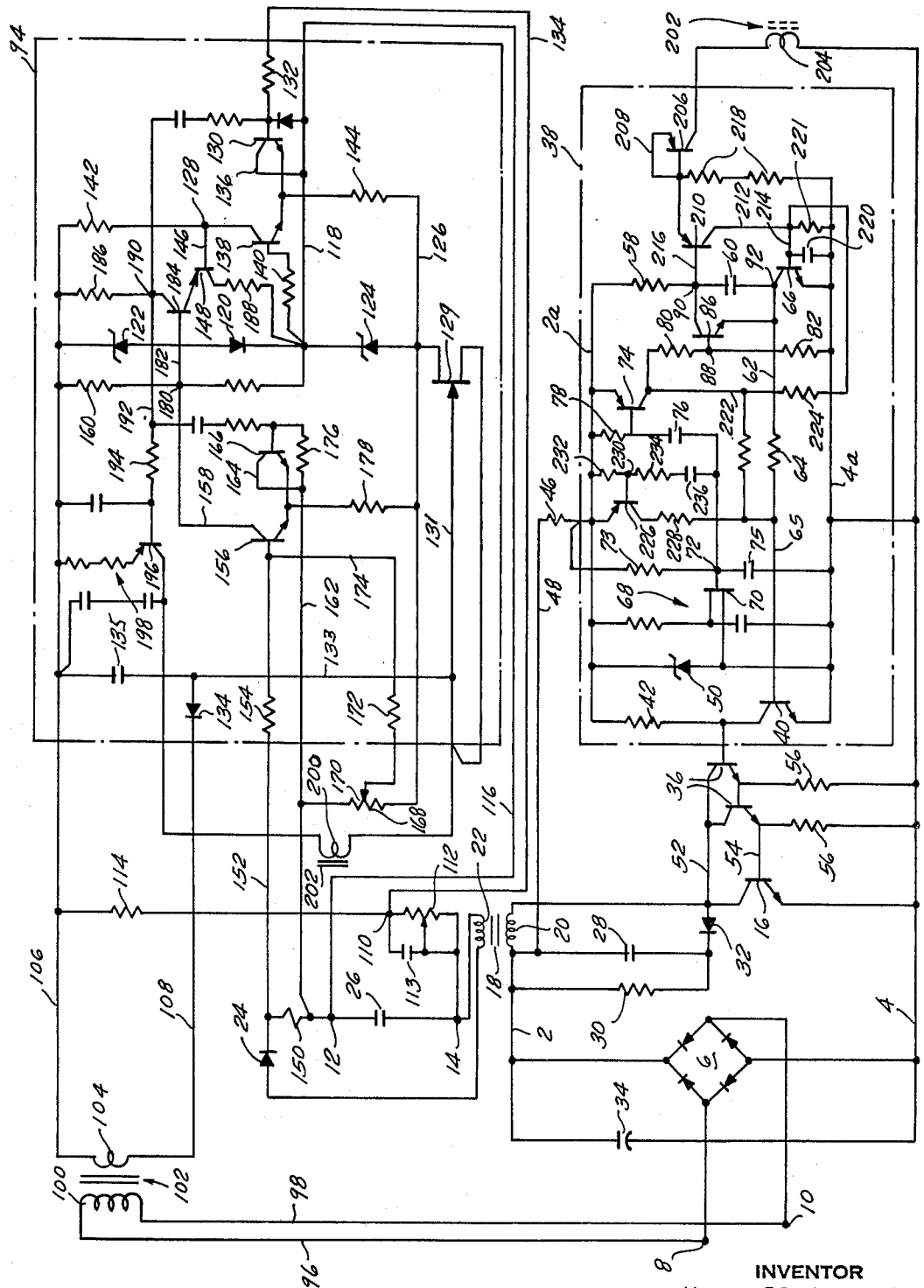
Oct. 21, 1969   J. M. SCHAEFER   3,474,325
CONTROL CIRCUITRY FOR SWITCHING-TYPE POWER SUPPLY
Filed April 21, 1967
INVENTOR
JOHANNES M. SCHAEFER
BY
ATTORNEY United States Patent Office 3,474,325
Patented Oct. 21, 1969

ABSTRACT OF THE DISCLOSURE

A power supply in which the output is regulated by varying the relative on and off times of a switching transistor connected across the input, in which improved means are provided for producing a parameter signal in accordance with two different output parameters, such as voltage and current, providing for a smooth transition of control from one parameter to the other depending upon their respective departures from a predetermined normal value, producing a sawtooth reference signal having a high degree of sharpness, comparing said parameter signal with said sawtooth reference signal and controlling the system output in accordance therewith, and preventing changes in the status of the switching transistor as a result of output transients or other irregularities.

---

The present invention relates to a transistorized power supply of the switching type, and in particular to circuit arrangements which will permit that power supply to function more accurately and effectively in maintaining the output thereof at a predetermined value and to regulate that output promptly in response to variations therein.

In transistorized switching-type power supplies of the type under discussion, one or more switching transistors are connected across the input line, and the length of time that they are conductive compared to the length of time that they are non-conductive controls the circuit output both of voltage and current—the longer the relative time that the switching transistors are rendered conductive, the greater is the output. Power supplies of this general type are known (one such is disclosed in my pending application Ser. No. 608,193 filed Jan. 9, 1967 and entitled "Power Supply with Switching Transistors," assigned to the assignee of this application). The requirements with regard to the accuracy, rapidity of action and stability of the output regulation achieved by such power supplies have become increasingly stringent, and call for greater and greater sophistication in their circuitry. The system of the present invention provides controls which enable it to be used where such stringent requirements exist.

In the system of the present invention, as in prior art systems, control of the regulating means is achieved by comparing a signal corresponding to one or more sensed output parameters and a reference signal in a form of a sawtooth, and actuating the regulating means in accordance with that comparison. The parameter signal may vary inversely as the controlled parameter, so that when the parameter goes down the parameter signal goes up. When the parameter signal exceeds the sawtooth reference signal the switching transistor is turned on, thereby to cause the output to tend to increase, and when the parametetr signal is less than the sawtooth reference the regulating means is actuated to cause the output to decrease. Prior art power supplies operating in this manner have in the past suffered from the fact that the reference sawtooth signals were not sufficiently sharp in nature, and as a result very fine control of the output at the upper portions of the parameter signal excursions, corresponding to unduly low parameters, was not possible. In accordance with the present invention means are provided for producing a reference sawtooth signal of extreme sharpness, thereby to permit carefully graduated output control over the entire range of output parameter excursions.

Each time that a switching transistor shifts between on and off condition there are losses in the system, and these losses reduce the efficiency of the system. It therefore is important to limit the number of times that the switching transistors shift between on and off conditions to the minimum of times needed to produce proper output control. However, situations tend to arise in practice where transient spikes in the parameter signal produce fluctuation of the switching transistor between on and off conditions within a given normal cycle of operation of the system. In order to prevent this type of multiple switching, means are provided for sensing when the status of the switching transistor does change in normal fashion and for thereafter, during that particular cycle of normal operation, preventing any change in the status of the switching transistor. To this end, each time that the reference signal exceeds the parameter signal, thus controlling the regulating means so as to tend to reduce the output, means are provided for lifting the reference signal to an appropriately high value such that voltage spikes in the parameter signal will have no effect, the reference signal being automatically returned to its normal level at the start of the next cycle of operation of the system. In my aforementioned application Ser. No. 608,193 circuitry is provided to produce this result. In the system here disclosed improved circuitry is provided to that end, that improved circuitry acting directly upon the capacitor at which the sawtooth reference signal is derived in order to modify the signal level thereof. The very transistor in the control circuit which determines the status of the regulating means acts to produce the spike-suppressing shift in the level of the reference signal. Hence positiveness of operation and circuit simplicity go hand in hand. The circuitry which produces the sharp sawtooth reference voltage is employed at the beginning of each sawtooth cycle to accurately and promptly reset the aforementioned transistor, and hence to return the nominal level of the reference signal to normal condition. In addition, means are provided for preventing the aforementioned transistor from affecting the regulating means during the time required to reset it as aforesaid. Hence suppression of the effects of transients is obtained without any sacrifice in the accuracy of the regulating action.

It is not unknown to control systems of the type in question in accordance with two output parameters, such as current and voltage, with one of those parameters (usually voltage) normally acting as the controlling parameter but with the other parameter (usually current) taking over control when it becomes excessive. While various circuits have been devised to this end, they are in general characterized by complexity and by a lack of smoothness in transferring control from one parameter to the other. In the instant system a simplified circuit is devised which provides for dual control of the type under discussion and for smooth transition of control from one parameter to the other depending upon which exceeds its normal value. This is accomplished by utilizing a pair of series-connected transistors in a parameter-signal-producing circuit, one of those transistors being controlled in accordance with one sensed parameter and the other being controlled in accordance with the other sensed parameter. The parameter signal output thus produced is representative of the conductivity status of both of the transistors in question, but when the conductivity of one is sufficiently reduced (as when its parameter becomes excessive) the conductivity of the other cannot be correspondingly increased, and as a result said one transistor under those circumstances predominates in control.

To the accomplishment of the above, and to such other objects as may hereinafter appear, the present invention relates to an improved switching-type power supply as defined in the appended claims and as described in this specification, taken together with the accompanying drawing, which is a circuit diagram of a preferred embodiment thereof.

POWER CIRCUIT

The input to the power supply is supplied across DC lines 2 and 4. When the external power source is of the alternating type, the full wave rectifier 6 is interposed between the input terminals 8 and 10 and the input lines 2 and 4 in conventional fashion. The DC output from the power supply is provided at output terminals 12 and 14, to which any appropriate external electrical connection may be made. For controlling the output provided at the terminals 12 and 14, a switching or power transistor 16 is connected across the input lines 2 and 4. An output transformer 18 comprising primary winding 20 and secondary winding 22 is interposed between the input lines 2 and 4 and the output terminals 12 and 14, the primary winding 20 thereof being connected in the input line 2. The secondary winding 22 of the output transformer 20 is connected to output terminals 12 and 14 via rectifier 24. A capacitor 26 is shunted across the output terminals 12 and 14 for the output smoothing purposes. Capacitor 28 and resistor 30 are connected in parallel with one another and in series with rectifier 32 across the primary winding 20 of the transformer 18. A filter condenser 34 may be connected across the input lines 2 and 4 in advance of the power transistor 16. The power transistor 16 is provided with a pair of Darlington-connected driver transistors 36.

REGULATING CIRCUITS

Means are provided for controlling the power transistor 16 through its driver transistors 36 so that the power transistor 16 is alternately rendered conductive and non-conductive, thereby to control current flow through the primary winding 20 of the output transformer 18 and hence the output at the output terminals 12 and 14.

SWITCHING TRANSISTOR CONTROL

The actuation of the power transistor 16 through its driver transistors 36 is accomplished by the circuitry enclosed within the broken line 38 in the drawing. Operatively connected to the driver transistors 36 is a bypass transistor 40. The emitter of bypass transistor 40 is connected to line 4a, which is at the same potential as line 4 and may be considered a reference potential such as ground. The collector of transistor 40 is connected via resistor 42 to line 2a, which is in turn connected to line 2 by resistor 46 and lead 48. Line 2a is therefore at a higher potential than line 4a. A Zener diode 50 connected between the lines 2a and 4a maintains their voltage difference at a predetermined value. The collectors of the driver transistors 36 are connected by lead 52 to the collector of switching transistor 16 and the emitters of transistors 36 are connected by lead 54 to the base electrode of switching transistor 16 and by resistors 56 to line 4. Base current for the driver transistors 36 is supplied via line 2a and resistor 42.

When base current reaches the driver transistors 36 base current is supplied to the switching transistor 16, its collector-emitter circuit becomes conductive, and current flows through the primary winding 20 of the output transformer 18 in a given direction. When the transistor 40 is rendered conductive the base current which formerly went to the driver transistors 36 is bypassed to the line 4a, the switching transistor 16 is turned off, and current ceases to flow through the primary winding 20 in said given direction. The current in the primary winding 20 is permitted to decay via the rectifier 32 and the resistance-capacitor network 30, 28. Because of the rectifier 24 in series with the secondary winding 22, as the current through the transformer primary 20 varies a unidirectional but fluctuating current is induced in the secondary winding 22, and that causes a substantailly constant voltage to appear at the output terminals 12, 14.

Base current is supplied to the transistor 40 from line 2a via resistor 58, capacitor 60, line 62, resistor 64 and line 65. A transistor 66 has its emitter-collector circuit connected between line 62 and line 4a. When the collector-emitter circuit of transistor 66 is non-conductive (when the transistor 66 is off), base current flows to the transistor 40 and that transistor is on, bypassing base current from the driver transistors 36 and turning switching transistor 16 off. However, when the transistor 66 is on the base current formerly supplied to transistor 40 is bypassed by transistor 66, and transistor 40 turns off, turning switching transistor 16 on. Hence actuation of the transistor 66 between on and off conditions causes the switching transistor 16 to switch between on and off conditions respectively, and the length of time that the transistor 66 is on compared to the line that it is off is reflected in the corresponding on and off times of the switching transistor 16.

COMPARISON OF REFERENCE AND PARAMETER SIGNALS

The on-off status of the transistor 66 is controlled by comparing a signal corresponding to one or more of the output parameters of the system (hereinafter termed the "parameter signal") with a reference signal in the form of a sawtooth, and controlling the conductivity status of the transistor 66 in accordance with that comparison. As here specifically disclosed, when the parameter signal is greater than the reference signal, the transistor 66 is on, thus turning the switching transistor 16 on and causing the output to tend to increase, and when the parameter signal is less than the reference signal, the transistor 66 is off, thus turning the switching transistor 16 off and causing the output to tend to decrease. Since, as has been stated above, the parameter signal is inversely related to the sensed parameter so that if the output voltage, for example, goes up the parameter signal will go down, the length of time that the reference signal exceeds the parameter signal will increase, the length of time that the transistor 66 is off will increase, the length of time that the switching transistor 16 is off will increase, and hence the output will tend to decrease. Conversely, if the output voltage should decrease the parameter signal will increase, the length of time that the reference signal exceeds the parameter signal will decrease, the length of time that the transistor 66 is off will decrease, the length of time that the switching transistor 16 is on will increase, and hence the output will tend to increase.

SHARP SAWTOOTH REFERENCE VOLTAGE

The reference voltage is in the form of a sawtooth. If that sawtooth is not sharp at its peak, then as the parameter signal approaches and exceeds the peak of the reference signal there will be a relatively large change in on time for the transistor 66 as between a situation where the parameter voltage just exceeds the peak reference voltage and a situation where the parameter voltage is just below the peak reference voltage. The sharper the sawtooth shape of the reference voltage the more gradual will be the transition between a full on condition of the transistor 66 and a partially on condition of the transistor 66. Hence the sharper the sawtooth voltage the more accurate and stable will be the output regulation when the sensed parameter is at the upper regions of its excursions.

The system of the present invention provides circuitry for producing a sawtooth reference voltage of exceptional sharpness. To that end an initial sawtooth voltage of normal but non-ideal sharpness is produced by a relaxation oscillator generally designated 68 and comprising unijunction transistor 70 the output of which, at point 72 located between resistor 73 and capacitor 75 connected across the lines 2a and 4a, is of sawtooth shape the frequency of which is determined by the values of the aforementioned resistor 73 and capacitor 75. In the past a sawtooth voltage of the type produced at point 72 has been used directly as the reference signal. In the present system, however, the sawtooth voltage at point 72 is fed to the base of transistor 74 through capacitor 76, a resistor 78 being connected between the base of transistor 74 and line 2a. The emitter of transistor 74 is connected to line 2a and its collector is connected via resistors 80 and 82 to line 4a. Because the base of transistor 74 is connected to point 72 by capacitor 76, the transistor 74 will be conductive only during that time that there is a rapid rate of change in the voltage at point 72, that is to say, only during the decay of the initial sawtooth voltage at point 72.

A transistor 86 has its base connected to point 88 located between the resistors 80 and 82 in the output circuit for transistor 74. The collector of transistor 86 is connected to point 90 between the resistor 58 and capacitor 60. The emitter of transistor 86 is connected to point 92 on the other side of capacitor 60 from point 90. The transistor 86 will have its emitter-collector circuit conductive only while current is flowing in the output circuit for the transistor 74, and hence only during the time that the initial sawtooth signal at point 72 is decaying. While the output circuit of transistor 86 is conductive the capacitor 60 will discharge therethrough. Hence as soon as the decay in the initial sawtooth voltage signal at point 72 commences, transistor 86 will be rendered conductive and the capacitor 60 will discharge therethrough virtually instantaneously. The transistor 86 will remain conductive, the capacitor 60 will remain discharged, and the voltage at point 90 will remain at its low value during the decay of the initial sawtooth signal at point 72. When that decay has terminated transistor 74 will turn off, transistor 86 will turn off, and capacitor 60 will commence to charge at a rate determined by its capacitance and the resistance of resistor 58. Hence the voltage at point 90 will rise. This charging of the capacitor 60 and rise in voltage at point 90 will continue until the next decay in the initial sawtooth voltage at point 72, which will cause the transistor 86 to be conductive and to discharge the capacitor 60 again. Thus there is produced at the point 90 a sawtooth voltage with a very sharp break between its rise and decay and with a very abrupt decay. This produces a reference voltage which, as the parameter voltage varies between points above the reference voltage peak and points slightly below the reference voltage peak, gives rise to a smooth transition in the comparison of those two voltages and the control of the transistor 66 in accordance with that comparison.

The circuitry for producing the parameter signal is in the main contained within broken line rectangle 94. The AC input terminals 8 and 10 are connected by lines 96 and 98 with the primary winding 100 of a transformer 102 having a secondary winding 104 connected to lines 106 and 108. Connected between output terminal 14 and point 110 is a variable resistor 112 shunted by capacitor 113. Connected between line 106 and point 110 is a resistor 114. Thus a reference voltage is developed across the resistor 114 and a voltage is developed across the resistor 112 which is representative of the output voltage at the terminals 12 and 14, the precise relationship between the output voltage across the terminals 12 and 14 and the voltage developed in the resistor 112 being determined by the resistance value to which that resistor 112 is set. Output terminal 12 is connected by lead 116 to line 118, which is in turn connected to line 106 by rectifier 120 and Zener diode 122, thereby producing a given potential difference between line 118 and line 106 and hence between output terminal 12 and line 106. A Zener diode 124 is connected between line 118 and line 126, thus ensuring that line 126 is at a predetermined potential (for example, 6 volt) below that of line 118.

A signal corresponding to the output voltage across point 12 and 14 is developed at point 128 in the following manner. The base of transistor 130 is connected by resistor 132 and lead 134 to the point 110. The collector of transistor 130 is connected by lead 136 to line 118, which is connected to line 116 and output terminal 12. Hence there is presented between the base and the collector of the transistor 130 a voltage which is representative of the output voltage across the terminals 12 and 14. The base of transistor 138 is connected by resistor 140 to line 118 which in turn is connected to line 116 and point 12. The collector of transistor 138 is connected by resistor 142 to line 106 and upper end of resistor 114. Hence there is applied between the base and collector of transistor 138 a voltage which corresponds to a reference voltage. The emitters of both transistors 130 and 138 are connected by resistor 144 to line 126. Field effect transistor 129 is also connected to line 126 and provides a constant current for the Zener diodes 122 and 124. The control electrode of the field effect transistor 129 is connected by leads 131, 133 and rectifier 134 to line 108, capacitor 135 being connected between line 106 and line 131. As a result, constant current is supplied to the resistor 144, that current dividing through the emitter-collector circuits of transistors 130 and 138 in accordance with the biasing of those transistors and hence in accordance with a comparison between the reference voltage which is applied across the collector and base of transistor 138 and the voltage representative of the system output voltage which is applied across the base and collector of transistor 130. As the output voltage increases, the output-voltage-affected transistor 130 will carry less current, the transistor 138 will carry more current and hence the voltage at point 128 will decrease. Point 128 is connected by lead 146 to the base of transistor 148, and hence as the transistor 138 becomes more conductive the transistor 148 will become less conductive.

The output current of the system is sensed by resistor 150 connected in series in the system output circuit. Lead 152 extends between the upper end of resistor 150 and the base of transistor 156 via resistor 154. The collector of transistor 156 is connected by lead 158 and resistor 160 to line 106. Leads 162 and 164 connect the collector of transistor 166 to the lower end of resistor 150. A resistor 168 is connected between lines 162 and 126, and a voltage tap 170 is provided thereon, that tap being connected by resistor 172 and lead 174 to the base of transistor 156. The base of transistor 166 is connected by resistor 176 to its collector lead 164. The emitters of the two transistors 156 and 166 are connected via resistor 178 to line 126. Hence here in a manner comparable to the voltage sensing circuit, the transistor 156 has applied to its base-collector circuit a voltage representative of the output current in the system and the transistor 166 has applied to its base-collector circuit a signal representative of an adjustable reference. A constant current is provided collectively to the two transistors via resistor 178, and their collector-emitter circuits will share that current in accordance with the signals applied thereto. As the output current increases, the amount of current carried by the transistor 156 will increase and hence the voltage at point 180 between resistor 160 and lead 158 will decrease. Point 180 is connected by lead 182 to the base of transistor 184, and hence as the conductivity of transistor 156 increases the conductivity of the collector-emitter circuit of transistor 184 will decrease.

The collector-emitter circuits of transistors 148 and 184 are connected in series with one another and with resistors 186 and 188 between lines 118 and 106. Point 190 between resistor 186 and the collector of transistor 184 is connected by lead 192 and resistor 194 to the base of transistor 196 connected in an oscillator circuit generally designated 198, the output of that oscillator circuit being applied to the primary winding 200 of a transformer generally designated 202 and having a secondary winding 204. The oscillator 198 is a constant frequency oscillator but the amplitude of its output is controlled by the voltage applied to the base of transistor 196, and this is in turn controlled by the conductivity of the transistors 148 and 184, that conductivity in turn being controlled by the relations between the voltage and current parameters of the power supply output and the reference signals respectively compared thereto, as described above. If one or the other of the transistors 148 and 184 is rendered substantially non-conductive, the voltage at point 190 rises, and hence an increased voltage will be applied to the transistor 196. As a result the amplitude of the oscillation outputs will be decreased, and this entirely independently of the conductivity status of the other of the transistors 148 and 184. On the other hand, if one of the transistors 148 or 184 is substantially fully conductive, then variations in the conductivity status of the other of those two transistors will change the amount of voltage applied to the base of transistor 196 and hence will control the amplitude of the oscillator output. Thus the amplitude of the oscillator output constitutes the parameter signal for the system, and is controlled by both the output voltage and the output current. As we have seen, if either the voltage or the current exceeds the reference to which it is compared, the transistor 148 or 184 controlled thereby will become less conductive, the voltage at point 190 goes up, and the oscillator 198 is caused to have a smaller amplitude output, the parameter signal thus being inversely related to the controlling parameter.

The use of the two transistors 148 and 184 in series, each controlled by a different parameter, provides for a ready and smooth shift between voltage control and current control depending upon the situation. Normally voltage control is desired except when the current exceeds a safe value. The system may therefore be designed so that the current-controlled transistor 184 is normally fully conductive, the voltage-controlled transistor 148 having an intermediate value of conductivity when the output voltage is at nominal value. Under these circumstances variations in output voltage up or down from that nominal value will cause variations in the conductivity of transistor 148 and hence will give rise to corresponding variations in the amplitude of the parameter signal. If, however, the current should exceed a safe value this will cause the current-controlled transistor 184 to become non-conductive or substantially so, and this will in turn affect the amplitude of the parameter signal no matter what the voltage output may be. Between these extreme positions there will be situations where the lack of conductivity of the current-controlled transistor 184 and of the voltage-controlled transistor 148 will work together to cause a change in the parameter signal. Hence the control effects produced by the voltage parameter and the current parameter of the output are blended into a composite smooth control.

The secondary winding 204 of the oscillator transformer 202 is connected between line 4 and the collector of transistor 206. The base and emitter of that transistor 206 are connected together by means of lead 208, so that it functions as a rectifier, and feeds the emitter of transistor 210. The collector of that transistor 210 is connected by leads 212 and 214 to the control electrode of transistor 66. The base of transistor 210 is connected by lead 216 to point 90. The base of transistor 206 is connected by resistors 218 to line 4a, and the base of transistor 66 is connected to line 4a by capacitor 220 in shunt with resistor 221. As a result, the transistor 210 constitutes the means for comparing the parameter signal which is applied to its emitter and the sawtooth reference voltage which is applied to its base. When the parameter signal applied to the emitter of transistor 210 exceeds the reference signal applied to the base of that transistor by an amount which is characteristic of the transistor, the base-collector circuit of that transistor will become conductive. This will supply base current to the transistor 66, turning it on and this, as we have seen, will bypass base current from the transistor 40 turning it off, this in turn providing base current to the driver transistors 36 and to the switching transistor 16, turning the latter on. When the above described relationship between the parameter signal and the reference signal does not obtain, transistor 210 turns off, base current is no longer applied to the transistor 66, it turns off, transistor 40 turns on, and switching transistor 16 turns off. In this way the relative on and off times of the switching transistor 16 is controlled in accordance with a comparison between the parameter signal applied to the emitter of transistor 210 and the sawtooth reference signal applied to the base of that transistor, the control being in a sense such (since the parameter signal varies inversely as the sensed parameter) to cause the sensed output parameter to maintain a predetermined value.

As we have seen, the transistor 66 turns off when the parameter voltage des not exceed the reference voltage by a sufficient amount. During the time that the transistor 66 is thus turned off, it is desirable that it not be turned on again during that cycle of the sawtooth reference signal. In order to accomplish this as here disclosed, the lower end of capacitor 60 is connected to reference voltage line 4a via the collector-emitter circuit of transistor 66. While that transistor 66 is on, as it will be while the parameter signal exceeds the reference signal, the lower end of the capacitor 60 will be at reference potential and the comparison between parameter signal and reference signal will take place normally. Once the reference signal exceeds the parameter signal, however, and the transistor 66 is turned off, the lower end of the capacitor 60 will rise in potential, this will cause its upper end to rise in potential, and hence the potential at point 90 will also rise, thus shifting the entire sawtooth reference signal upwardly in voltage. This upward shift is sufficient so that even if spikes or other transients should occur in the parameter signal, those spikes or other transients will ordinarily not exceed the sawtooth voltage and hence will not turn the transistor 66 back on.

It is necessary that the capacitor 60 will reset at the beginning of each new sawtooth cycle. This is accomplished in the system here disclosed by lead 222 and resistor 224 which connect the collector of transistor 74 with the base of transistor 66. As we have seen, transistor 74 will have an output during the time that the initial sawtooth signal at point 72 decays. This output will in part, through the connection just described, provide base current for the transistor 66 and thus turn that transistor on, thereby once again returning the lower end of capacitor 60, and hence point 90, to normal potential.

While transistor 74 renders transistor 66 conductive, but before the normally corresponding relation between parameter signal and reference signal obtains, the switch 16 is held on. This is generally not desirable, since it reduces flexibility and accuracy of control. In order to prevent this from occurring, means are provided for ensuring that transistor 40 stays on, thus keeping switching transistor 16 off, during the resetting of transistor 66 and until normal parameter sensing and comparing resumes. To this end transistor 226 has its emitter connected to line 2a and its collector connected to the base of transistor 40 via resistor 228. Its base is connected to point 230 between resistors 232 and 234, the lower end of resistor 234 being connected to point 72 by capacitor 236. Thus each time that the initial sawtooth signal at point 72 decays, the transistor 226 will be turned on at the same time that transistor 74 is turned on. When transistor 226 is conductive base current is supplied to transistor 40 and it is kept conductive. The values of resistor 232 and 234 preferably exceeds the value of resistor 78 while the capacitors 76 and 236 may have the same value, thereby producing a slower charging rate for capacitor 236 than for capacitor 76. As a result transistor 226 remains conductive for a somewhat longer period than transistor 74, thereby to take into account the switching time of transistor 66.

Through the employment of the circuitry here disclosed, a power supply is produced which has a high degree of accuracy, speed of response and stability, which is responsive to a plurality of output parameters with a smooth transition of control from one to the other as that may vary, and which increases the life of the system and its efficiency to prevent spurious switching which might otherwise arise by means of transients of other irregularities either in the output itself or in the sensing circuitry of the system.

While but a single embodiment of the present invention has been here disclosed, it will be apparent that many variations may be made therein, all within the scope of the instant invention.

I claim:

1. A power supply comprising an input, an output, regulating means between said input and said output, and control means for said regulating means comprising means for sensing an output parameter and producing a parameter signal relating thereto, first means for producing an initial sawtooth signal, second means for sensing the decay of said initial sawtooth signal and producing an output pulse lasting substantially only for the time of said decay, a first capacitor and a charging circuit therefor, and third means operatively connected between said second means and said first capacitor and effective to discharge said first capacitor during the time said pulse exists, thereby to produce at a reference voltage point connected to said first capacitor a sawtooth reference signal of sharp configuration, and means for comparing said reference signal and said parameter signal and controlling said regulating means in accordance with said comparison.

2. The power supply of claim 1, in which said second means comprises a first solid state valve the control electrode of which is connected to said first means via a second capacitor for actuation thereof to render said first valve conductive during said time of said decay, said first valve being connected to an output circuit, said third means comprising a second solid state valve the output electrodes of which are connected across said first capacitor and the control electrode of which is connected to said output circuit of said first valve.

3. The power supply of claim 2, in which said comparing means comprises a third solid state valve to a first electrode of which said parameter signal is connected, to a second electrode of which said reference voltage point is connected, and to a third electrode of which said regulating means is connected.

4. The power supply of claim 2, in which said comparing means comprises a third solid state valve to a first electrode of which said parameter signal is connected, to a second electrode of which said reference voltage point is connected, and to a third electrode of which said regulating means is connected, said first and third electrodes being output electrodes and said second electrode being a control electrode.

5. The power supply of claim 1, in which said comparing means comprises a third solid state valve to a first electrode of which said parameter signal is connected, to a second electrode of which said reference voltage point is connected, and to a third electrode of which said regulating means is connected.

6. The power supply of claim 1, in which said comparing means comprises a third solid state valve to a first electrode of which said parameter signal is connected, to a second electrode of which said reference voltage point is connected, and to a third electrode of which said regulating means is connected, said first and third electrodes being output electrodes and said second electrode being a control electrode.

7. A power supply comprising an input, an output, regulating means between said input and said output, and control means for said regulating means comprising means for sensing an output parameter and producing a parameter signal relating thereto, means for producing an initial sawtooth signal, a first solid state valve to the control electrode of which said initial signal is connected via a capacitor, a second solid state valve to the control electrode of which an output electrode of said first valve is operatively connected, the output electrodes of said second valve being connected to a reference point to produce at said reference point a sharp sawtooth signal, and means for comparing said sharp sawtooth signal and said parameter signal and controlling said regulating means in accordance with said comparison.

8. In the power supply of claim 7, a first output circuit to which the output electrodes of said first valve are connected, said first output circuit comprising impedance means connected across a voltage source, the control electrode of said second valve being connected to a point on said first output circuit, a second output circuit to which the output electrodes of said second valve are connected, said second output circuit comprising impedance means connected across a bias voltage source and comprising a second capacitor connected across the output electrodes of said second valve, said reference point being located at the operative end of said second capacitor remote from said bias voltage source.

9. The power supply of claim 7, in which said comparing means comprises a third solid state valve to a first electrode of which said parameter signal is connected, to a second electrode of which said reference point is connected, and to a third electrode of which said regulating means is connected.

10. The power supply of claim 7, in which said comparing means comprises a third solid state valve to an output electrode of which said parameter signal is connected, to another output electrode of which said regulating means is connected, and to a control electrode of which said reference point is connected.

11. A power supply comprising an input, an output, regulating means between said input and said output, and control means for said regulating means comprising means for sensing an output parameter and producing a parameter signal relating thereto, means for producing at a point a sawtooth reference signal, a first solid state valve the output electrodes of which are operatively connected to said regulating means, means for comparing said reference signal and said parameter signal, a capacitor operatively connected at one end to said point at which said reference signal is produced and at its other end to a bias voltage via the output electrodes of said first valve, and means operatively connected between said reference-signal-producing means, said comparing means, said control electrode of said first valve and said capacitor and effective (a) to render said first valve nonconductive when a selected one of said reference signal and said parameter signal exceeds the other, thereby to cause the voltage at said point to rise via said capacitor and thereby to operatively affect said regulating means in a predetermined fashion, (b) to render said first valve conductive when each sawtooth of said reference signal decays irrespective of the comparison between said reference and parameter signals, and (c) to discharge said capacitor at the close of the rising portion of each sawtooth of said reference signal.

12. In the power supply of claim 11, means operatively connected between said sawtooth-reference-signal-producing means and said regulating means effective to overcome the effect of said first valve on said regulating means at least during the time involved in said rendering of said first valve conductive when each sawtooth of said reference signal decays irrespective of the comparison between said reference and parameter signals.

13. The power supply of claim 11, in which said operative connection between said firrst valve and said regulating means comprises a second solid state valve the output electrodes of which are connected to said regulating means and the control electrode of which is connected to an output electrode of said first valve, and means operatively connected between said sawtooth-reference-signal-producing means and said control electrode of said second valve effective to overcome the effect of said first valve on said control electrode of said second valve at least during the time involved in said rendering of said first valve conductive when each sawtooth of said reference signal decays irrespective of the comparison between said reference and parameter signals.

14. The power supply of claim 11, in which said operative connection between said first valve and said regulating means comprises a second solid state valve the output electrodes of which are connected to said regulating means, means for normally supplying base current to the control electrode of said second valve, said first valve when conductive bypassing said base-current-supplying means for said second valve, and means operatively connected between said sawtooth-signal-producing means and said control electrode of said second valve effective to supply base current to said control electrode of said second valve at least during the time involved in said rendering of said first valve conductive when each sawtooth of said reference signal decays irrespective of the comparison between said reference and parameter signals.

15. In combination with the power supply of claim 11, first means for producing an initial sawtooth signal, sacond means for sensing the decay of said initial sawtooth signal and producing an output pulse lasting substantially only for the time of said decay, a charging circuit operatively connected to said capacitor, said operative connection means for discharging said capacitor being effective to cause said discharge during the time said pulse exists, thereby to produce a sharp sawtooth signal at said point, said operative connecting means rendering said first valve conductive when said sawtooth signal decays irrespective of the comparison between said reference and parameter signals comprising a connection between said second means and said first valve.

16. In the power supply of claim 15, means operatively connected between said sawtooth-reference-signal-producing means and said regulating means effective to overcome the effect of said first valve on said regulating means at least during the time involved in said rendering of said first valve conductive when each sawtooth of said reference signal decays irrespective of the comparison between said reference and parameter signals.

17. The power supply of claim 15, in which said operative connection between said first valve and said regulating means comprises a second solid state valve the output electrodes of which are connected to said regulating means, means for normally supplying base current to the control electrode of said second valve, said first valve when conductive bypassing said base-current-supplying means for said second valve, and means operatively connected between said sawtooth-signal-producing means and said control electrode of said second valve effective to supply base current to said control electrode of said second valve at least during the time involved in said rendering of said first valve conductive when each sawtooth of said reference signal decays irrespective of the comparison between said reference and parameter signals.

18. In combination with the power supply of claim 15, in which said operative connection between said first valve and said regulating means comprises a second solid state valve the output electrodes of which are connected to said regulating means and the control electrode of which is connected to an output electrode of said first sawtooth-reference-signal-producing means and said control electrode of said second valve effective to overcome the effect of said first valve on said control electrode of said second valve at least during the time involved in said rendering of said first valve conductive when each sawtooth of said reference signal decays irrespective of the comparison between said reference and parameter signals, said last mentioned operative connection comprising additional means for sensing the decay of said initial sawtooth signal and producing a second output pulse lasting for a longer time than the output pulse of said second means, said second output pulse being operatively connected to said control electrode of said second valve.

19. In combination with the power supply of claim 15, in which said operative connection between said first valve and said regulating means comprises a second solid state valve the output electrodes of which are connected to said regulating means and the control electrode of which is connected to an output electrode of said first valve, and means operatively connected between said sawtooth-reference-signal-producing means and said control electrode of said second valve effective to overcome the effect of said first valve on said control electrode of said second valve at least during the time involved in said rendering of said first valve conductive when each sawtooth of said reference signal decays irrespective of the comparison between said reference and parameter signals, said last mentioned operative connection comprising additional means for sensing the decay of said initial sawtooth signal and producing a second output pulse lasting for a longer time than the output pulse of said second means, said second output pulse being operatively connected to said control electrode of said second valve, said additional means comprising another solid state valve the output terminals of which are connected to said control electrode of said second valve and the control electrode of which is connected to said first means via a capacitor.

20. A power supply comprising an input, an output, regulating means between said input and output, and control means for said regulating means, said control means comprising means for sensing first and second output parameters and producing a final parameter signal which varies with variations in said parameters, said final-parameter-signal-producing means comprising a final-parameter-signal-producing impedance connected across a voltage supply in series with the series-connected output electrodes of first and second solid state valves, means for sensing said first output parameter and producing a first parameter signal the magnitude of which varies in accordance with variations in said first parameter, means for connecting said first parameter signal to the control electrode of said first valve, means for sensing said second output parameter and producing a second parameter signal the magnitude of which varies in accordance with variations in said second parameter, and means for connecting said second parameter signal to the control electrode of said second valve, the signals applied to said control electrodes varying the conductivity of the respective valves between the output electrodes thereof.

21. In the power supply of claim 20, oscillator means the amplitude of the output of which is variable in accordance with the variable actuation of the input thereof, said output of said oscillator means being connected to said control means, and means connecting said final-parameter-signal-producing impedance in actuation-relationship to said oscillator input.

22. The power supply of claim 21, in which at least one of said parameter-signal-producing means is effective to compare its respective sensed output parameter with a reference value and to produce a parameter signal which is representative of the difference between said sensed output parameter and the corresponding reference.

23. The power supply of claim 21, in which at least one of said parameter-signal-producing means is effective to compare its respective sensed output parameter with a reference value and to produce a parameter signal which is representative of the difference between said sensed output parameter and the corresponding reference, the parameter signal produced thereby being effective on its associated valve in a sense such as to decrease the conductivity of said valve between its output electrodes as said parameter signal increases.

24. The power supply of claim 21, in which at least one of said parameter-signal-producing means is effective to compare its respective sensed output parameter with a reference value and to produce a parameter signal which is representative of the difference between said sensed output parameter and the corresponding reference, and in which said parameter-signal-producing means comprises first and second solid state valves, one of the output electrodes of each valve being connected to a common impedance, means for supplying a constant current to said common impedance through the output electrodes of said valves collectively, the other output electrode and the control electrode of said first valve being connected across a source of reference voltage, the other output electrode and the control electrode of said second valve being connected operatively to said sensed output parameter, said parameter signal being derived from said one output electrode of one of said valves.

25. The power supply of claim 21, in which at least one of said parameter-signal-producing means is effective to compare its respective sensed output parameter with a reference value and to produce a parameter signal which is representative of the difference between said sensed output parameter and the corresponding reference, the parameter signal produced thereby being effective on its associated valve in a sense such as to decrease the conductivity of said valve between its output electrodes as said parameter signal increases, and in which said parameter-signal-producing means comprises first and second solid state valves, one of the output electrodes of each valve being connected to a common impedance, means for supplying a constant current to said common impedance through the output electrodes of said valves collectively, the other output electrode and the control electrode of said first valve being connected across a source of reference voltage, the other output electrode and the control electrode of said second valve being connected operatively to said sensed output parameter, said parameter signal being derived from said one output electrode of one of said valves.

26. The power supply of claim 20, in which at least one of said parameter-signal-producing means is effective to compare its respective sensed output parameter with a reference value and to produce a parameter signal which is representative of the difference between said sensed output parameter and the corresponding reference.

27. The power supply of claim 26, in which said parameter-signal-producing means comprises first and second solid state valves, one of the output electrodes of each valve being connected to a common impedance, means for supplying a constant current to said common impedance through the output electrodes of said valves collectively, the other output electrode and the control electrode of said first valve being connected across a source of reference voltage, the other output electrode and the control electrode of said second valve being connected operatively to said second output parameter, said parameter signal being derived from said one output electrode of one of said valves.

28. The power supply of claim 20, in which at least one of said parameter-signal-producing means is effective to compare its respective sensed output parameter with a reference value and to produce a parameter signal which is representative of the difference between said sensed parameter and the corresponding reference, the parameter signal produced thereby being effective on its associated valve in a sense such as to decrease the conductivity of said valve between its output electrodes as said parameter signal increases.

29. The power supply of claim 28, in which said parameter-signal-producing means comprises first and second solid state valves, one of the output electrodes of each valve being connected to a common impedance, means for supplying a constant current to said common impedance through the output electrodes of said valves collectively, the other output electrode and the control electrode of said first valve being connected across a source of reference voltage, the other output electrode and the control electrode of said second valve being connected operatively to said sensed output parameter, said parameter signal being derived from said one output electrode of one of said valves.

References Cited

UNITED STATES PATENTS

| | | |
|---|---|---|
| 3,305,764 | 2/1967 | Todd. |
| 3,356,930 | 12/1967 | Lupoli et al. _____ 323—20 |
| 3,377,546 | 4/1968 | Schott. |

JOHN F. COUCH, Primary Examiner

A. D. PELLINEN, Assistant Examiner

U.S. Cl. X.R.
323—22, 38